(No Model.) 5 Sheets—Sheet 1.
F. HIGGINS & R. S. EASTMAN.
GEAR CUTTING MACHINE.
No. 301,891. Patented July 15, 1884.
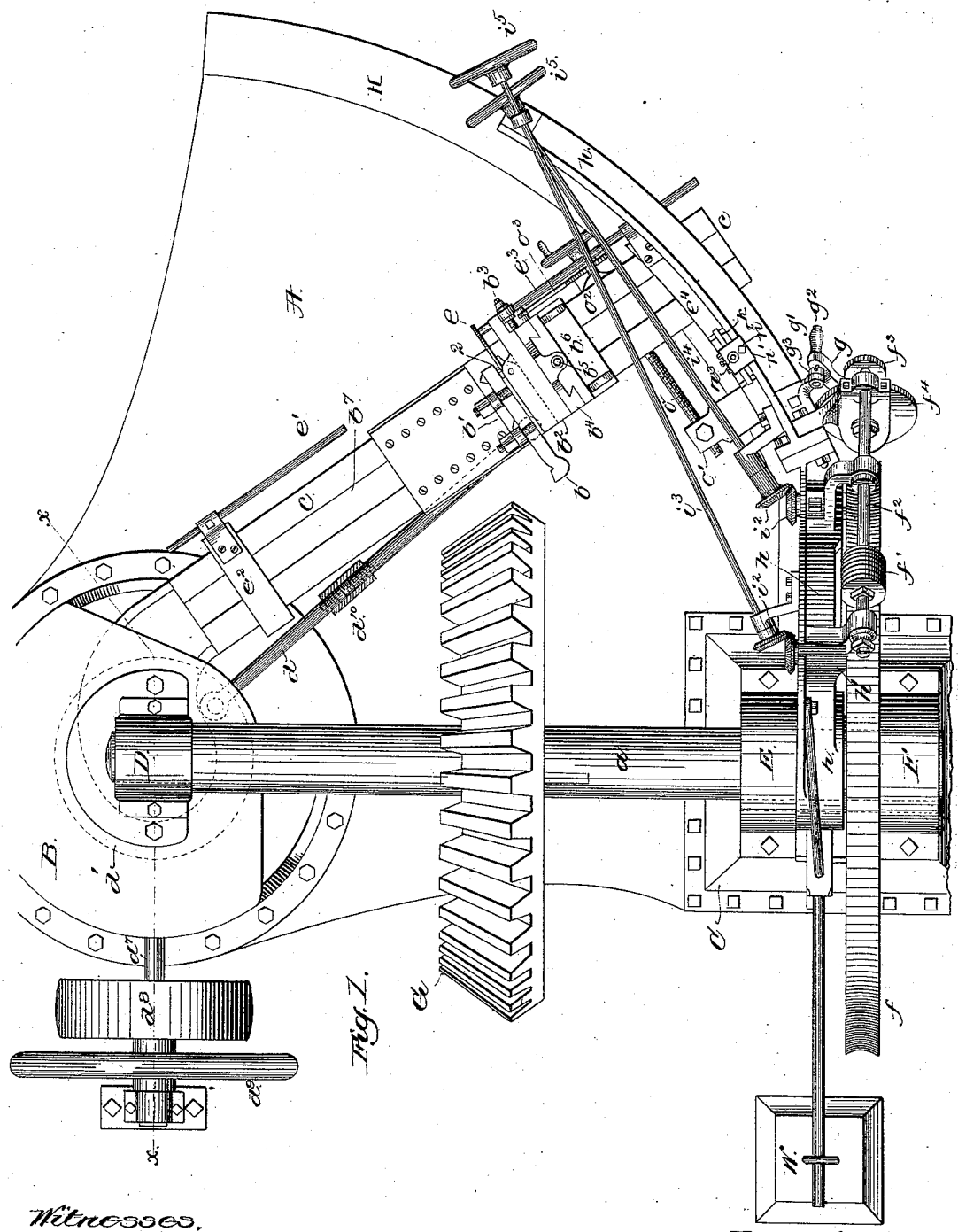
Witnesses,
John F. C. Prinkert,
Fred A. Powell.
Inventors,
Freeman Higgins
Richard S. Eastman
by Crosby & Gregory Attys

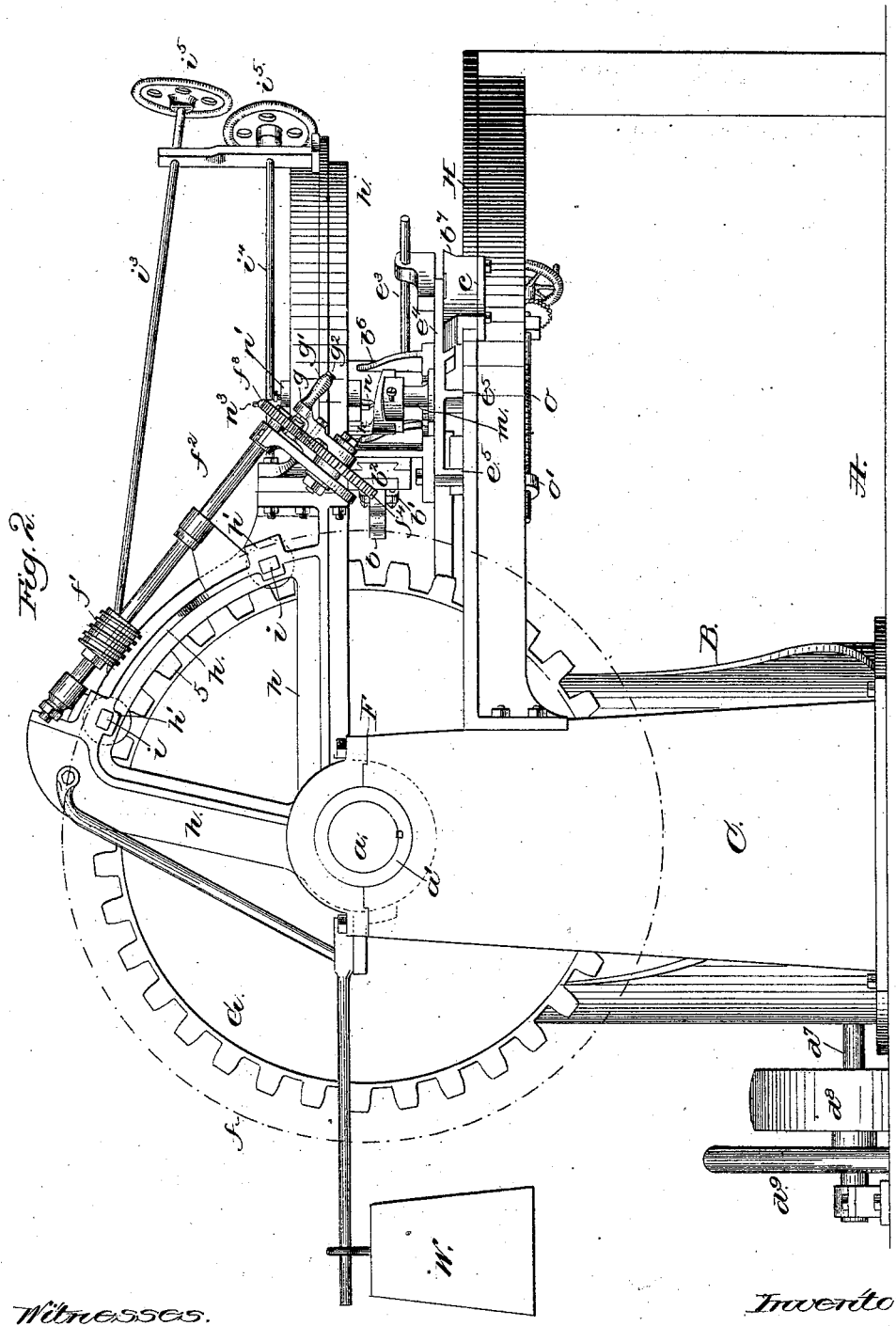

(No Model.) 5 Sheets—Sheet 3.
F. HIGGINS & R. S. EASTMAN.
GEAR CUTTING MACHINE.
No. 301,891. Patented July 15, 1884.
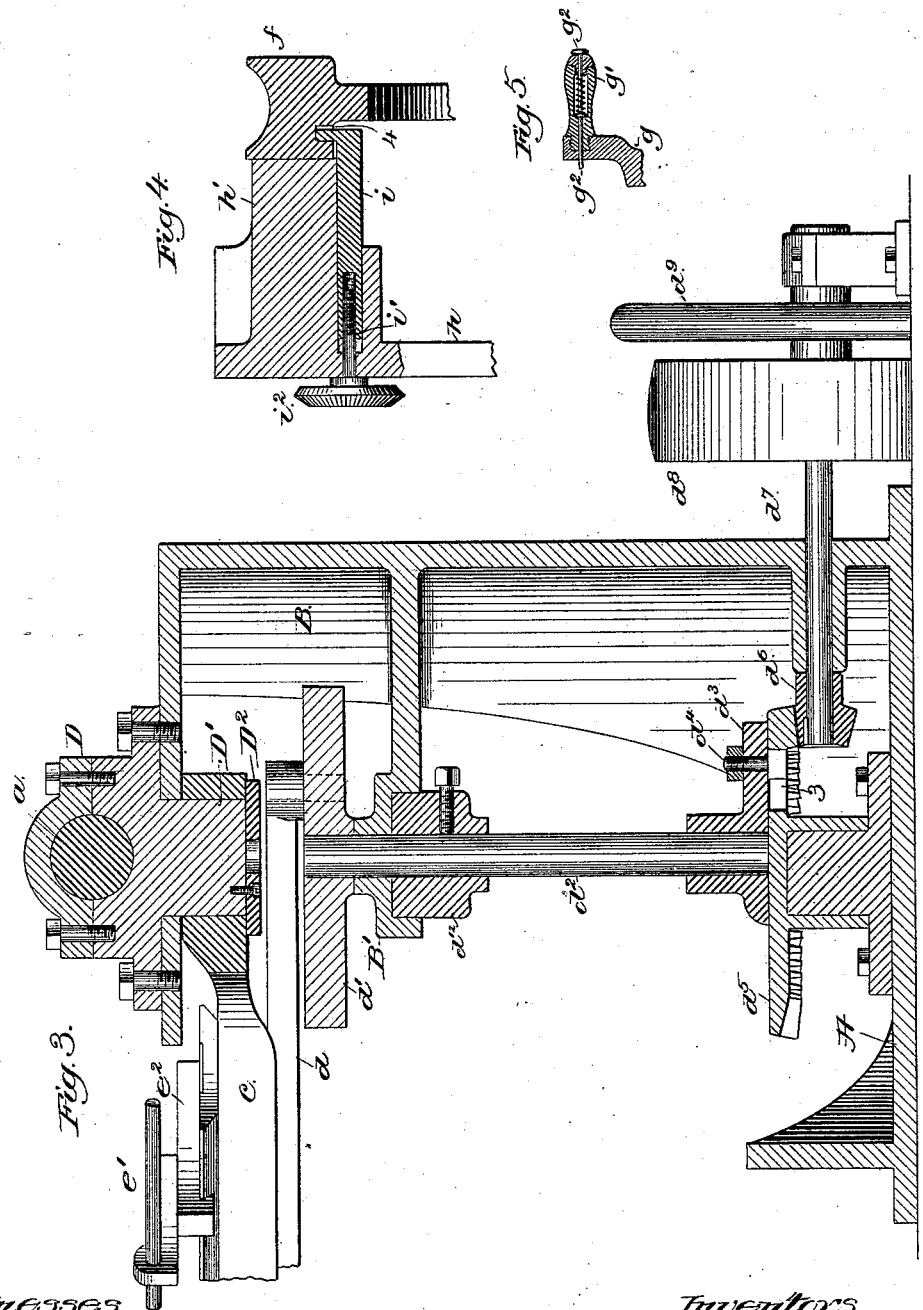
Witnesses.
John F. C. Prentiss
Fred A. Powell
Inventors.
Freeman Higgins.
Richard S. Eastman
by Crosby & Gregory
attys.

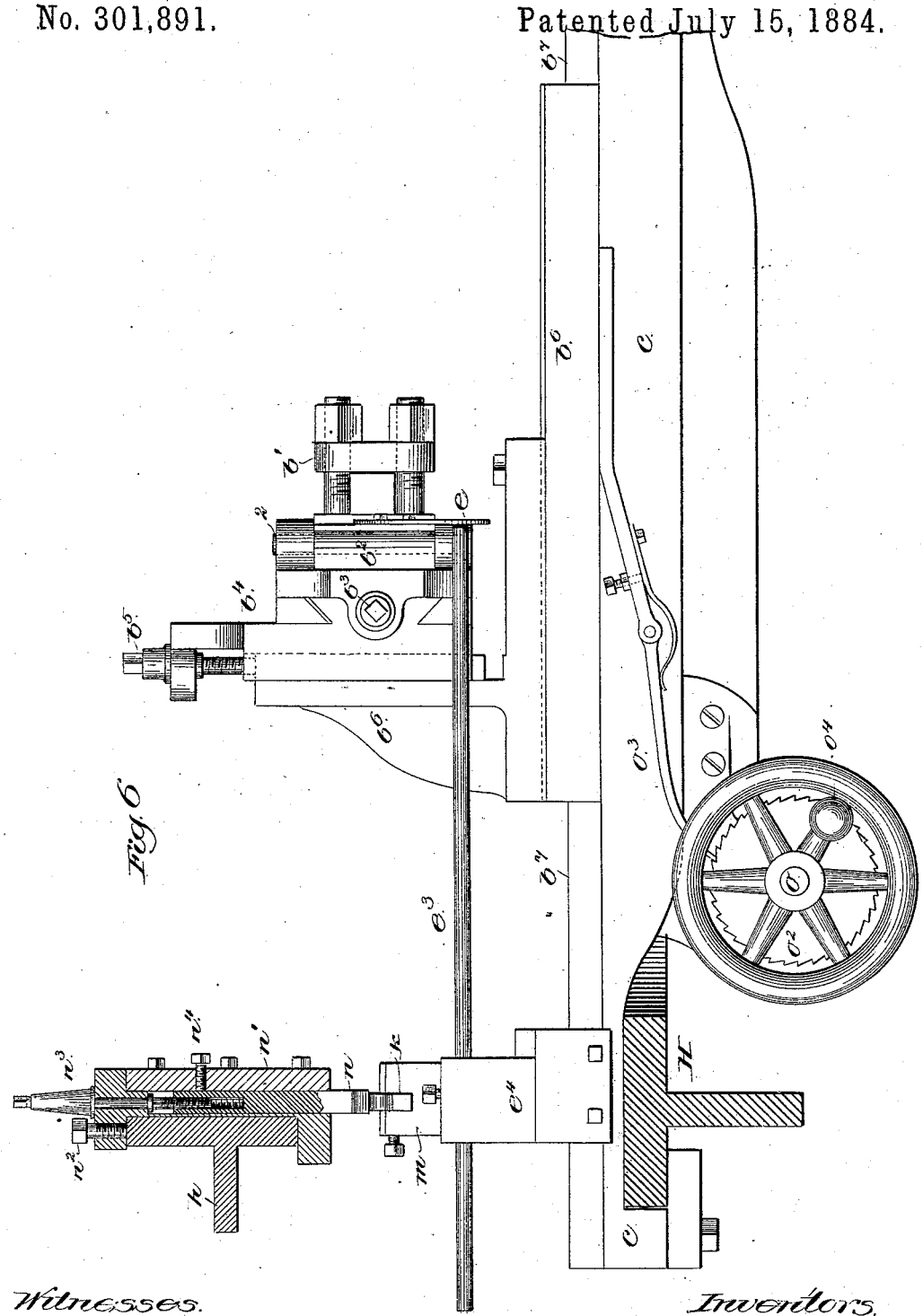

(No Model.)　　　　　　　　　　　　　　　　5 Sheets—Sheet 5.
F. HIGGINS & R. S. EASTMAN.
GEAR CUTTING MACHINE.
No. 301,891.　　　　　　　　Patented July 15, 1884.
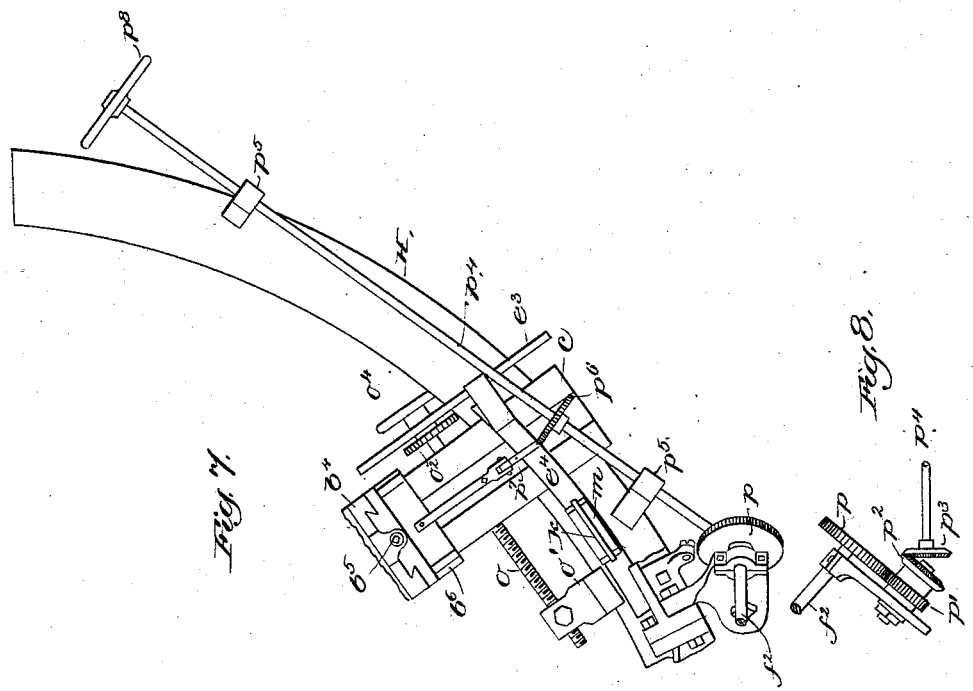
Witnesses.
John F. C. Prinkert
Fred A. Powell
Inventors.
Freeman Higgins
Richard S. Eastman
by Crosby & Gregory
attys.

UNITED STATES PATENT OFFICE.

FREEMAN HIGGINS AND RICHARD S. EASTMAN, OF MANCHESTER, N. H.

GEAR-CUTTING MACHINE.

SPECIFICATION forming part of Letters Patent No. 301,891, dated July 15, 1884.

Application filed April 4, 1883. (No model.)

*To all whom it may concern:*

Be it known that we, FREEMAN HIGGINS and RICHARD S. EASTMAN, both of Manchester, county of Hillsborough, State of New Hampshire, have invented an Improvement in Gear-Cutting Machines, of which the following description, in connection with the accompanying drawings, is a specification, like letters on the drawings representing like parts.

Our invention relating to gear-cutting machines is embodied in a machine of that class in which the gore being cut is fixed upon an arbor mounted in stationary bearings, so that it can have only a rotary movement, and the tool-carriage bed is pivoted upon an axis passing through the apex of the gear being cut, so that the cutting-tool has a movement toward or from the arbor of the gear in one plane; and in order to give the proper shape to the sides of the teeth the gear and its arbor are turned or rotated in the bearings of the latter as the tool is fed radially toward or from its axis, the said rotating movement for shaping the tooth being governed by a templet or former operating in unison with the feeding movement of the tool, so as to produce exactly the desired shape.

The present invention consists in various details of construction and combination of elements whereby the operation of the machine is made more convenient and far more accurate than that of gear-cutting machines heretofore in use. The rotating movement of the gear, by which it is moved to present a new tooth to the cutter, is accomplished by suitable index mechanism, and is wholly independent of the rotating movement for shaping the tooth. Means are also provided for giving the gear a rotary feeding movement, so as to enable the ends or face of the teeth and the spaces between the teeth to be planed to a true conical shape.

Figure 1 is a plan view of a gear-cutting machine embodying this invention; Fig. 2, a front elevation thereof; Fig. 3, a partial vertical section on line $x\ x$, Fig. 1, looking from the rear toward the front, on a larger scale; Figs. 4 and 5, details to be referred to; Fig. 6, an elevation, partly in section, showing the tool-post and tool-carriage bed and connected parts on a larger scale; Fig. 7, a partial plan view of the mechanism for giving a continuous rotary feed to the gear for cutting the ends of the teeth and the spaces between the bases thereof, and Fig. 8 a front elevation of a portion of the mechanism shown in Fig. 7.

The main frame-work or bed A of the machine is provided with uprights B C, having stationary bearings D E F for the arbor $a$, upon which the gear G, the teeth of which are to be cut, is mounted, the said gear being fixed upon the said arbor, so as to have no longitudinal or rotary movement thereon, although the said arbor is free to rotate in its bearings. The arbor $a$ is reduced in diameter, or has a shoulder at the bearing D, to prevent longitudinal movement when the gear is acted upon by the tool or cutter $b$. The said tool $b$ is held in a clamp, $b'$, pivoted at 2 in a slide, $b^2$, adjustable in a horizontal direction, by means of a screw, $b^3$, (see Fig. 6,) in a block, $b^4$, adjustable up and down by a screw, $b^5$, upon the tool post or carriage $b^6$, mounted to slide on ways $b^7$ upon the tool-carriage bed $c$, having one end pivoted upon a downward extension or spindle, $D'$, of the bearing D for the gear-arbor $a$, as shown in Fig. 3. The axis of the revolution of the said bed $c$ intersects the axis of the arbor $a$ at the apex of the gear to be cut, or, in other words, at the common point of intersection of the lines bounding the ends of its teeth, if produced, so that by the proper vertical adjustment of the tool $b$ its path of movement may be brought into the same plane with the axis of the gear-supporting arbor $a$. The end of the carriage-bed $c$, that pivots on the projection $D'$, is supported by a flange or collar, $D^2$. The other end of the said bed $c$ is mounted to slide on a curved guide or sector, H, supported on the bed A, and concentric with the axis of revolution on the spindle $D'$ of the said bed $c$. By the proper vertical and horizontal adjustment of the tool-clamp $b'$, the path of movement of the cutting-edge of the tool $b$ may be brought exactly in a line intersecting the apex of the gear G; and it will be seen that from the relation between the axis of the arbor $a$ and that of the spindle $D'$, the line of movement of the said cutting-edge will always pass through the said apex of the gear as the said tool-bed $c$ is revolved around the axis $D'$ and upon the sector H, and that the said tool will be guided by the said sector in a single horizontal plane toward or from the axis of the said arbor $a$, its bed being supported firmly at both ends. The tool carriage or post $b^6$ is reciprocated back and forth upon the ways $b^7$ by means of a link or connecting-rod, $d$, connected at one end with a stud upon the under side of the said tool-carriage, and at its other end with a wrist-pin made radially adjustable upon a wrist-plate, $d'$, (see Fig. 3,) connected with a vertical shaft, $d^2$, having a bearing at $B'$ in the upright B of the main frame-work, the said shaft $d^2$ being provided at its lower end with an arm, $d^3$, having a stud, $d^4$, entering a slot, 3, in a beveled gear, $d^5$, actuated by a pinion, $d^6$, upon the shaft $d^7$, provided with the actuating belt-pulley $d^8$ and a fly-wheel, $d^9$.

The parts last described constitute the tool-actuating mechanism, and the gear $d^5$ is eccentric to the shaft $d^2$, thus producing a variable motion in the shaft $d^2$, by which the tool $b$ has a slow forward movement while acting upon the gear G, and a rapid return movement, as is customary in planing apparatus. The length of movement or travel of the tool-carriage and tool may be varied by adjusting the wrist-pin toward or from the center of the wrist-plate $d'$, and the location of the said travel may be varied by a turn-buckle, $d^{10}$, in the link $d$. The shaft $d^2$ has a collar, $d^{12}$, for giving it a steadier support in the bearing $B'$. The tool-clamp $b'$, pivoted at 2, is provided with a yielding arm, $e$, which, at the end of the forward movement of the tool-carriage, engages a trip-rod, $c'$, set in proper position upon a bracket, $c^2$, at the forward end of the tool-carriage bed $c$, thus turning the tool aside, so that in its return movement it does not come in contact with the metal of the gear G. At the end of the return movement the said arm $e$ engages another trip-rod, $c^3$, also adjustable in a bracket, $c^4$, mounted in the rear end of the tool-carriage bed $c$, by which the tool-clamp and tool is turned back into the position shown in Fig. 1, to operate upon the gear in its forward movement, it then being supported by the block $d^4$ and post $b^6$. The end of the gear-holding arbor $a$, supported in the bearings E F, is preferably provided with a sleeve, $a'$, (see Fig. 2,) for greater convenience in removing it when desired to apply or remove the gears G, the said sleeve, however, being keyed or otherwise prevented from rotating on the said arbor, and having keyed or fixed upon it a worm-gear, $f$, constituting a portion of the index mechanism by which the arbor and gear G thereon are rotated the proper distance to present a new tooth after one side of one tooth has been finished. The said gear $f$, shown in Fig. 2 in dotted lines only, is actuated by a worm, $f'$, mounted on a shaft, $f^2$, actuated by suitable gearing, $f^3 f^4$, so proportioned that one complete rotation of the said gear $f^4$ will produce sufficient movement in the worm-gear $f$ to move the gear G, being cut for the space of one tooth. The gear $f^4$ is turned by the operator, after one face of each tooth is finished, by means of a crank, $g$, having a handle, $g'$, provided with a spring-pressed latch or bolt, $g^2$, (see Fig. 5,) for engaging a suitable socket-piece, $g^3$, (see Fig. 1,) fixed relative to the said gears $f^3 f^4$. The bearings of the shaft $f^2$ of the worm $f'$ and gear $f^3$, and the bearing of the gear $f^4$, by which the said shaft is actuated, are mounted on an arm, $h$, loosely pivoted upon the sleeve or bushing $a'$ of the arbor $a$, so that the said arbor and gear G thereon may be rotated relative to the said arm $h$ by means of the index mechanism just described, and after it has been thus rotated the said arm $h$ and the worm-gear $f$ are locked together and the arbor $a$ and gear G consequently fixed relative to the said arm $h$ by means of locking devices consisting of hooked rods $i$, (see Fig. 4,) the hooked ends or fingers of which engage an annular groove, 4, in the worm-gear $f$, the said rods $i$ being actuated by screw-threaded stems $i'$, operated by bevel-gearing $i^2$, rotated by spindles $i^3 i^4$, (see Figs. 1 and 2,) provided with hand-wheels $i^5$, properly located to be readily accessible to the operator in charge of the machine. Thus by rotating the said hand-wheels $i^5$ the said locking or clamping rods $i$ are drawn so as to tightly clamp the gear $f$ between their hooked ends and the adjacent abutments $h'$ of the arm $h$. When thus clamped, it will be seen that the gear G can have no rotary movement relative to the arm $h$; and in order to give proper shape to the sides of the teeth, as the cutter is fed with its carriage-bed $c$ toward and in the plane of the axis of the arbor $a$, the said arm $h$, which, for convenience in operating upon gears of different size or bevel, is extended around in the form of a sector above the guiding-sector H of the tool-carriage bed, is provided with means for producing a rotary movement of the gear, having a definite relation to the feeding movement of the tool-carriage bed as follows: The said tool-carriage bed has connected with it a templet, $k$, shaped to give the desired form to the teeth, the said templet being shown in this instance as secured in an upright, $m$, mounted on the bracket $c^4$ upon the end of the tool-carriage bed $c$, the said bracket also having feet $c^5$ resting in and guided by the upper surface of the sector H, (see Fig. 2,) for greater steadiness and solidity. The arm $h$ is provided with a knife edge or support, $n$, resting on the said templet $k$, (see Fig. 2,) the said support $n$ being longitudinally movable in a socket-piece, $n'$, securely fastened at the proper point upon the arm $h$ by the set-screw $n^2$. (See Fig. 6.) The said support $n$ has a delicate vertical adjustment by means of the adjusting-screw $n^3$, so that the gear G, when fixed with relation to the arbor and index mechanism, may be easily and accurately adjusted with relation to the path of the cutting-tool $b$, and when thus adjusted the support $n$ is rigidly fastened by the set-screw $n^4$. The said arm $h$, support $n$, and templet constitute the means for giving what may be called the "shaping rotary movement" of the gear G, or the movement by which the proper shape for the teeth is produced, and the weight of the arm $h$ is partially counterbalanced by a weight, W.

The feeding movement of the tool-carriage bed $c$, by which the tool $b$ is caused to progress from the end or point of each tooth toward the bottom thereof, and the templet $k$, moved to give the shaping rotary movement of the gear G, as just described, is effected by means of the feed-screw $o$, having a rotary without longitudinal movement on the said carriage $c$, but being drawn longitudinally into or out from a nut, $o'$, fixed in proper position upon the sector H. The shank of the said screw $o$ is provided with a ratchet, $o^2$, (see Fig. 6,) engaged by a pawl, $o^3$, carried by the tool-carriage $b^6$, so as to rotate the said screw $o$ a slight amount at the end of each backward movement of the tool-carriage, so that the tool in its next forward movement is somewhat nearer the axis of the arbor $a$, upon which the gear G is mounted. It will be seen that by the said feeding movement of the carriage a different portion of the templet $k$ is presented to the support $n$, thus usually causing a slight rotary movement of the arbor $a$, transmitted through the arm $h$ and connected parts, so that the said cutter is fed forward over the material forming the tooth, being cut in a path corresponding with the shape of the said templet, thus giving the desired shape to the faces of the teeth.

As shown in Fig. 1, the cutter is acting on the upper face of the teeth, and it will be seen that when the cutter is farthest removed from the axis of the arbor $a$, or begins operating upon the tooth near its end, the support $n$ rests on the highest point of the templet $k$, and as the carriage-bed $c$ is fed by the screw $o$ toward the arbor $a$, the said support $n$ has a general descending movement upon the surface of the templet $k$, so that the successive cuts of the tool are farther and farther from a radial plane through the middle of the tooth being cut, or, in other words, the said tooth is made thicker toward its base than at its end in correspondence with the shape of the supporting surface of the templet $k$.

It will be seen that the gear while being cut has a rotary movement similar to that which the finished gear will have when subsequently in operation in connection with other gears, and that the movement of the tool-carriage bed being in a single plane is positively guided by firm solid ways, and the arbor of the gear is securely held in rigid bearings, so that there can be no lost motion between the tool and the material cut by it, thus enabling the work to be accomplished with great accuracy. The co-operating parts of the guiding mechanism for shaping the teeth are rigidly connected, the one with the gear and the other with the tool-carriage bed, so that the movement of the gear is directly dependent on the feeding movement of the tool, and there can be no lost motion or irregularity of movement of the one member of the shaping mechanism with relation to the other, as is the case in machines in which the rotary movement of the gear and the feeding movement of the tool are produced by different turns of mechanism actuated by a common power. After the upper face of a tooth has been cut, the tool-carriage bed $c$ is withdrawn by rotating the feed-screw $o$ in the reverse direction to that in which it was turned by the pawl $o^3$, by means of a hand-wheel, $o^4$, and the clamps $i$ are then loosened and the index mechanism turned, rotating the worm-gear $f$ and gear G for the space of one tooth relative to the arm $h$, after which the said worm-gear and arm $h$ are again clamped together and the planing-tool set in operation to cut another tooth, it being fed and the wheel being rotated by the templet or guide to give proper shape, as before described. After all of the teeth have been planed on one side, the templet $k$ is reversed, end for end, in its socket or upright $m$, and the other sides of the said teeth are planed in the same manner.

As heretofore practiced, the ends of the teeth have usually been turned in a lathe and the spaces between the recesses thereof dressed by other machinery than that by which the sides are formed. In the present apparatus, however, means are provided for planing the ends and spaces between the bases of the teeth as follows: To accomplish this the tool $b$ must not advance toward the axis of the arbor $a$, but will have to remain always at the same distance therefrom, and consequently, after the carriage-bed $c$ has been moved to the proper point by means of the feed-screw $o$, the pawl $o^3$ will be raised or moved, so as not to act on the ratchet $o^2$. The worm-gear $f$ will then be unclamped from the arm $h$, and the gear G may be fed with a rotary movement, so as to present different parts to the tool $b$ by means of the worm $f'$ and gearing connected therewith. As herein shown, this is accomplished automatically by means of the gears $p\ p'$, which are substituted for the index-gears $f^3\ f^4$, the latter being removed from the shaft $f^2$ and the bearing-pin or arbor on a projection from the arm $h$, the said gears being detachable to enable pairs of different proportions to be substituted or to enable the feeding-gears $p\ p'$ to be applied. The gear $p$ is fixed upon the shaft $f^2$ of the worm $f'$, (see Figs. 7 and 8,) and the gear $p'$ is mounted on the bearing-pin that previously received the gear $f^4$, and is provided with a bevel-pinion, $p^2$, meshing with a bevel-pinion, $p^3$, mounted on a shaft, $p^4$, supported in suitable bearings, $p^5$, mounted on the sector H. The said shaft $p^4$ is provided with a feed-ratchet, $p^6$, engaged and operated by an actuating device shown as a feed-pawl, $p^7$, connected with the tool-post $b^6$, and engaging and rotating the said ratchet, and through the intermediate mechanism the gear G, at each backward movement of the said tool-carriage.

In planing the spaces 5 (see Fig. 2) between the bases of the teeth, the tool $b$ will have to be withdrawn after each of the said spaces is finished, and the gear may then be rapidly rotated by means of the hand-wheel $p^5$, mounted on the arbor $p^4$ of the rotary feeding mechanism, after which the tool will again be moved forward to the proper position to operate on the next space.

The main feature of the invention consists in shaping the teeth by the rotary movement of the gear, while the feeding movement, by which the cutter is made to act successively on different portions of the surface of the tooth, takes place in one plane only, instead of combining the feeding and shaping movements of the tool by causing the tool and gear to approach one another in a curved path, as heretofore practiced.

We claim—

1. In a gear-cutting machine, the gear-supporting arbor and tool-carriage bed, combined with feeding and guiding mechanism to cause one to approach the other in one plane of movement, and a templet and co-operating support composing the two members of the tooth-shaping mechanism, one of the said members being rigidly connected with the arbor, and the other with the tool-carriage bed, whereby the said arbor and gear thereon receive a rotary movement having a definite relation to the feeding movement or advance of the tool causing the teeth to be cut to the desired shape, substantially as described.

2. The gear-supporting arbor and fixed bearings therefor, and the pivoted tool-carriage bed supported on a rigid guide or way which limits the movement of the said bed to one plane only, combined with an arm and means to lock and fix it relative to the arbor, and a templet and co-operating support, one rigidly fixed on the said arbor, and the other on the tool-carriage bed, whereby a definite rotary movement is transmitted through the said arm to the gear being cut, as the bed is moved toward or from the latter, substantially as described.

3. The gear-supporting arbor and arm loosely pivoted thereon, and the tool-carriage bed, and the templet and support connected one with the said bed, and the other with the said arm, combined with index mechanism, having one portion mounted on and fixed relative to the said arbor, and the other portion mounted upon the said arm, substantially as described.

4. The gear-supporting arbor and arm loosely pivoted thereon, and the tool-carriage bed, and the templet and support connected one with the said bed and the other with the said arm, combined with the index mechanism, a portion of which is attached to the said arm, and the co-operating portion of which is fixed relative to the said arbor, and a clamp or locking device for clamping the said arm to the portion of the index mechanism that is fixed on the arbor, substantially as described.

5. The gear-supporting arbor mounted in fixed bearings, and the tool-carriage bed, and rigid sector or guide for one end thereof, and spindle or pivot for the other end thereof, the said bed being supported on the said sector, and movable only in one plane parallel therewith, combined with the tool carriage or post and its actuating mechanism, and feed mechanism automatically operated by the tool-carriage, whereby the tool-carriage bed is moved on its guide toward the said arbor, substantially as described.

6. The gear-supporting arbor and an arm and means to lock them together, combined with the tool-carriage bed movable in one plane, and the templet and co-operating support connected one with the said bed and the other with the said arm, as and for the purpose described.

7. The arm $h$ and tool-carriage bed, combined with the templet and co-operating support, and means for adjusting the same toward and from the same templet, substantially as and for the purpose described.

8. The gear-supporting arbor, and feeding mechanism therefor, combined with the tool-carriage, and an actuating device connected therewith for operating the said gear-feeding mechanism, substantially as described.

In testimony whereof we have signed our names to this specification in the presence of two subscribing witnesses.

FREEMAN HIGGINS.
RICHARD S. EASTMAN.

Witnesses:
L. B. CLOUGH,
FRANK C. TWOMBLY.